(No Model.)
J. NAGEL.
WIRE REELING TRUCK.
No. 515,870. Patented Mar. 6, 1894.
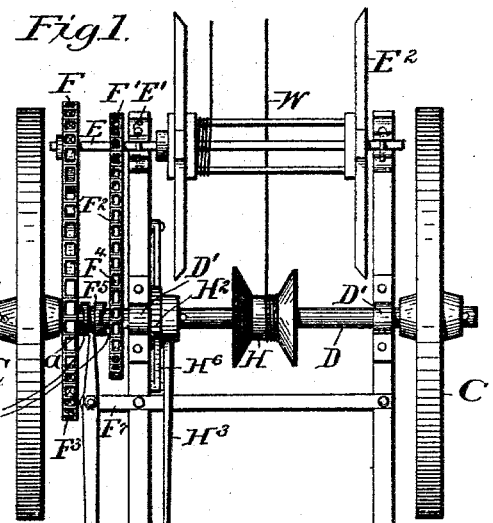
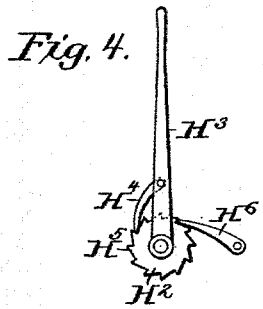
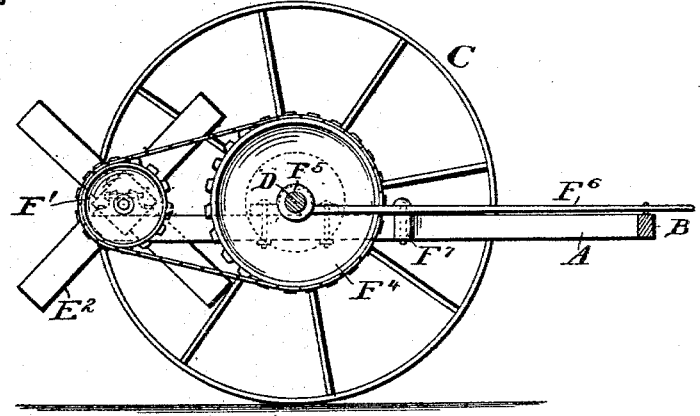
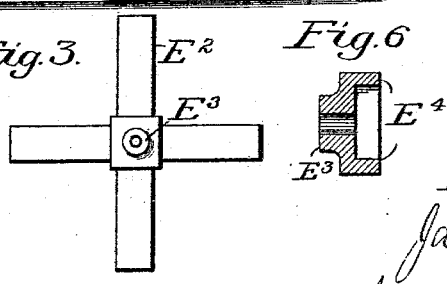
Witnesses:
W. F. Wallen
A. M. Nelson
Inventor:
Jacob Nagel
James H. Barley
Attys
THE NATIONAL LITHOGRAPHING COMPANY,
WASHINGTON, D. C.

UNITED STATES PATENT OFFICE.

JACOB NAGEL, OF NEAR HOUSTONIA, MISSOURI.

WIRE-REELING TRUCK.

SPECIFICATION forming part of Letters Patent No. 515,870, dated March 6, 1894.

Application filed June 3, 1893. Serial No. 476,518. (No model.)

*To all whom it may concern:*

Be it known that I, JACOB NAGEL, residing near Houstonia, Pettis county, State of Missouri, have invented certain new and useful Improvements in Wheel-Trucks for Reeling and Unreeling Barb Fence-Wire, of which the following is a specification, reference being had therein to the accompanying drawings.

My invention relates to certain new and useful improvements in wire reeling trucks used for the purpose of unreeling and stretching wire along the line of a fence preparatory to its being stapled to the posts; and when it becomes necessary to remove a barb wire fence, my machine is equally useful in rewinding the wire upon spools after it has been removed from the fence posts.

The object of this invention is to furnish a durable and effective machine which greatly facilitates the work of reeling and unreeling barb wire both in building and removing fences as hereinafter more fully described and pointed out in the claims, reference being had therein to the accompanying drawings forming part of this specification in which like letters of reference refer to like parts and in which drawings—

Figure 1, is a top view of a wire reeling truck embodying my invention. Fig. 2, is a view of the same in side elevation. Fig. 3, is a detail view of a wire spool and its driver casting. Fig. 4, a view of the ratchet and ratchet lever. Figs. 5 and 6 are enlarged details.

In carrying my invention into effect I provide a suitably constructed frame consisting of side bars A, A, provided with suitable journal boxes D' D', rear end cross bar B, wheels C C, and axle D upon which the frame is mounted. At the forward end of the frame bars A, a spool supporting cross shaft E is journaled in open top boxes E', with retaining pins $E^2$, passing horizontally through the upper part of said boxes above the journals of the shaft, holding it in place. The shaft E after being passed through a center hole $E^3$ of the wire spool, is placed in the boxes, and rotated by means of two pair of sprocket wheels, varying in size for the purpose of giving different motions to the spool shaft E, the wheels F and F', attached to shaft E are driven by sprocket chains or belts $F^2$, $F^2$, passing around said wheels and around driving wheels $F^3$ and $F^4$, fitting loosely on the axle D of the main power wheels C, C, which travel upon the ground, as shown in Figs. 1 and 2. Between wheels $F^3$ and $F^4$, a sliding clutch $F^5$, is placed having suitable teeth T on each of its ends fitting alternately in corresponding teeth on the inner ends of the two wheel hubs. The clutch $F^5$ is held from turning on the axle by a pin passing through the same, or by means of a spline key laid in the axle allowing the clutch to slide back and forth thereon; and it is shifted by a lever $F^6$, pivoted on a fulcrum bar, $F^7$, the front end of said lever fitting into an annular groove $a$, of the clutch $F^5$. In order to put the truck in motion the operator grasps the rear cross frame bar B, with his hands and pushes the truck forward in front of him.

The two chain wheels $F^3$ and $F^4$, if disengaged from the clutch $F^5$, will not rotate the shaft E and spool $E^2$ thereon when the truck is moved either backward or forward.

$E^3$ is a casting having a center bore through which the shaft E passes, and is keyed fast thereon and provided with two projecting flanges $E^4$, which extend over the two opposite edges of one of the crossed bars $E^2$, which form the ends or head portion of the wire spool, these flanges serving the purpose of driving or causing the wire spool to rotate with the shaft E in either direction.

When distributing wire along the line of fence posts preparatory to being stapled thereto, the clutch is thrown out of gear with the chain wheels $F^3$ and $F^4$, permitting said wheels and the spool shaft to rotate independent of the axle D, the truck is then made to travel backward unwinding the wire from the spool until a suitable distance has been reached, the wire is then cut from the reel or spool $E^2$, and is attached to the tension wheel H, on the axle D, the truck being anchored in any suitable manner on the ground and the driving pin H', through the hub and axle of the wheel C, is withdrawn. There is a ratchet wheel $H^2$ on the axle D, and a ratchet lever $H^3$, journaled thereon independent of the ratchet wheel. When lever $H^3$, is pulled backward, the upper end of a pawl $H^4$, attached thereto engages with teeth H⁵, of said ratchet wheel, causing axle D and tension wheel H to rotate, whereby the wire W, by winding around the tension wheel H, is stretched to a proper tension and held by the ratchet pawl H⁶, attached to the frame bar A, until the strand of wire or cable has been stapled to the posts. This operation is repeated until the fence is completed.

When it becomes necessary to remove barb or other wire from the fence posts and rewind it upon spools, the clutch is thrown in gear with the chain wheel F⁴, and held by dropping the rear end of lever F⁶, over a retaining pin or catch B'. The truck is then pushed by the operator traveling forward, causing the chain F², to rotate the spool, winding the wire thereon until the diameter of the wire coil on spool increases so as to begin to take up the wire faster than the travel of the truck will permit. In this instance the clutch is thrown out of gear with the wheel F³, and in gear with wheel F⁴, which being smaller in diameter the velocity of the wire spool decreases. And when the spool becomes filled with wire the two pins E², are withdrawn from the open top boxes, and the shaft E with the spool of wire is lifted out and removed from the shaft, and an empty spool is placed thereon and the shaft and spool again replaced in the open top boxes of the truck frame.

I claim—

1. In a wire reeling truck the combination of the truck frame A, B; axle D, mounted upon wheels C; spool supporting shaft E journaled on the front end of said frame; chain wheels F, F', F³, F⁴, mounted in pairs of varying size on shafts E and D respectively, and two chains F², passing around said wheels; whereby the shaft E is driven alternately by either one of said chains.

2. The within described wire reeling truck, embracing the frame A, B; axle D, mounted upon wheels C; a reel supporting shaft E, journaled in open top boxes of the frame; two driving chains passing around chain wheels F, F', F³, F⁴, varying in diameter located on shaft E and axle D; and a sliding clutch on the axle engaging alternately with the chain wheels F³, F⁴, substantially as specified.

3. In a wire reeling truck the combination of the truck frame A B; axle D mounted upon two wheels; a reel supporting shaft E journaled on the front end of the truck frame; chain wheels F, F', F³, F⁴, and driving clutch F⁵, mounted on axle D; shifting lever F⁶, and chains F², whereby the velocity of the shaft E is varied at will of the operator, while the truck is in motion substantially as specified.

4. The within described two wheel truck for reeling and unreeling barb wire along the line of fence posts, embracing the truck frame A, B; axle D mounted upon wheels C; reeling shaft E journaled on the front part of the truck frame; chains and chain wheels for driving said shaft tension wheel H and ratchet wheel H⁵, on the axle D, rotated by means of a hand lever H³, carrying a ratchet pawl, and provided with a holding pawl pivoted on the truck frame, substantially as specified.

In testimony whereof I affix my signature in presence of two witnesses.

JACOB NAGEL.

Witnesses:
JAMES M. BYLER,
H. N. KNAPP.